(No Model.)
A. O. MORGAN & J. B. GATES.
DEVICE FOR AERATING MILK.
No. 418,956. Patented Jan. 7, 1890.
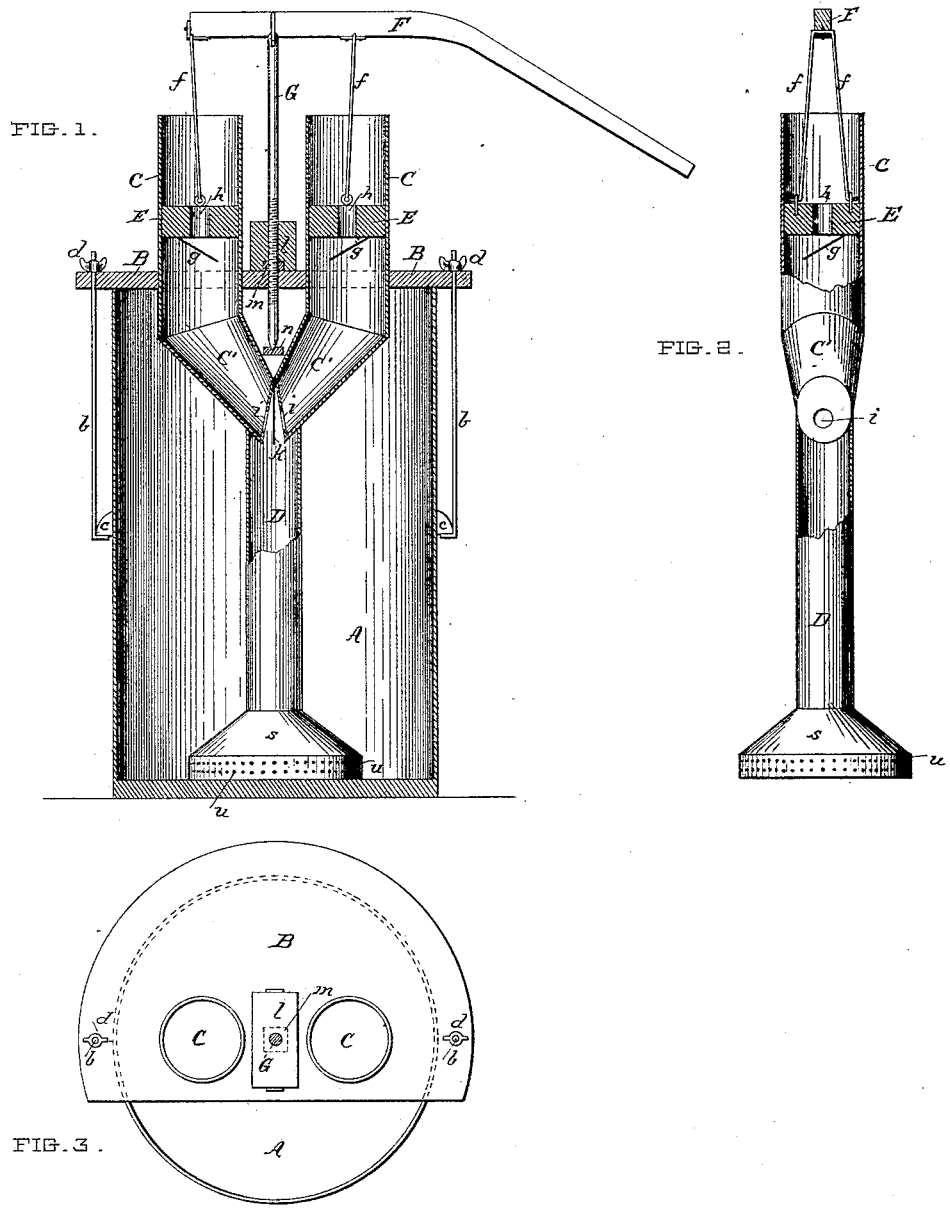

UNITED STATES PATENT OFFICE.

ALDIS O. MORGAN AND JEROME B. GATES, OF HERMON, NEW YORK.

DEVICE FOR AERATING MILK.

SPECIFICATION forming part of Letters Patent No. 418,956, dated January 7, 1890.

Application filed May 15, 1889. Serial No. 310,833. (No model.)

*To all whom it may concern:*

Be it known that we, ALDIS O. MORGAN and JEROME B. GATES, of Hermon, in the county of St. Lawrence and State of New York, have invented a new and useful Improvement in Devices for Aerating Milk, of which the following is a full, clear, and exact description.

Our invention relates to devices for cooling and expelling the noxious volatile matters from milk in cans or vessels used for holding the latter as drawn from the cow by forcing atmospheric air into and through the milk; and the invention consists in an apparatus of novel construction for the purpose, substantially as herein shown and described, and pointed out in the claims.

Reference is to be had to the accompanying drawings, forming a part of this specification, in which similar letters of reference indicate corresponding parts in all the figures.

Figure 1 represents a mainly sectional vertical view of a milk-can and our aerating apparatus applied thereto; Fig. 2, a further mainly sectional vertical view of said apparatus in a plane at right angles to Fig. 1; and Fig. 3, a plan view, in part, of the same as applied to the can.

A indicates a milk can, tank, or vessel designed to contain the milk to be aerated. Upon the top of this vessel we place a partial cover B, which may be constructed to leave about one-fourth of the top of the vessel open, or be otherwise suitably constructed to provide for the escape of the noxious volatile matters and heated vapors from the milk. This partial cover is held down on the can by means of hook-rods $b$, adapted to engage with or under handles $c$ on the body of the can, and having screw-threads on their upper ends, that, passing through the partial cover, are fitted with thumb-nuts $d$. Projecting down through and above this cover are two pump cylinders or barrels C C, which, with their immediate connections, consisting of tapering converging lower elbows C' C' and dip-tube D, into which said elbows project at their lower ends, are or may all be made of tin.

Within the cylinders C C are fitted plungers E E, preferably made of wood, and which are connected, as by wires $ff$, with a pump-handle F on opposite sides of the fulcrum of the latter to make of the apparatus a double-acting air-force pump. Upon the bottom side of each of these plungers is an air-inlet valve $g$, of rubber or leather, which, as the plunger descends, closes an aperture $h$ through the plunger, but opens to admit air during the ascent of the plunger. The lower ends of the tapering elbows C' C', which enter through opposite sides of the upper portion of the dip-tube D, are closed on their faces, with the exception of a small lower aperture $i$ in them, and said end faces set angling, so as to meet above, but diverging from each other in a downward direction, and between these two contiguous end faces is suspended a light rubber or leather valve $k$, which alternately serves to open and close the outlet-apertures $i$ for the air into the dip-tube D as the handle F is worked up and down, thus making the one valve $k$ control both pump-cylinders.

The fulcrum of the handle F is upon the upper end of a rod G, which passes down through a block $l$, fast upon the cover B. This block is fitted with a nut $m$, through which a lower screw-threaded portion of the rod G works, and the bottom end of said rod is arranged to turn in a step $n$ upon the upper closed end of the dip-tube D at or near the crotch formed by the tapering elbows C'. This provides for raising or lowering the rod G, to adapt the apparatus to milk cans or vessels of different size or depth.

The dip-tube D is made flaring and open at its bottom, so as to form a conical air-distributer $s$, with a series of perforations $u$ in and around its larger and lower end or rim, which is shown as resting upon the bottom of the can.

The wires $ff$ and rod G may be connected with the handle F by means of clips, which will permit of their ready attachment and detachment as desired.

This apparatus may be readily fitted to almost any milk-can and as readily be removed therefrom when required, and when in operation it will, by its double action, keep up a continuous supply of cool air to and through the milk, for the purpose of cooling the latter and for driving off from the milk the noxious volatile matters contained in it, thus adding to the sweetness and preservation of the milk.

Having thus described our invention, what we claim as new, and desire to secure by Letters Patent, is—

1. In a device for aerating milk, the double-acting air-force pump having duplicate cylinders C C, with tapering lower elbows C' C', converging toward one another and having perforated angling bottom end faces, the dip-tube D, within which the lower ends of the said elbows project, with its attached perforated air-distributer s, the valve k, controlling both cylinders, and the apertured plungers E, with their attached valves g, substantially as specified.

2. In a device for aerating milk, the combination of the partial cover B for the pan or vessel containing the milk to be aerated, the pump-cylinders C C, arranged to project therethrough and provided with lower tapering and converging elbows C' C', having angling perforated bottom end faces, the dip-tube D, with its attached perforated air-distributer s, the valve k, the apertured plungers E, with their attached valves g, the plunger wires or connections f f, the pump-handle F, and the adjustable screw-threaded fulcrum support or rod G, with the nut m therefor connected with the cover B, essentially as shown and described.

ALDIS O. MORGAN.
JEROME B. GATES.

Witnesses:
P. L. DOYLE,
H. B. HAMLIN.